Nov. 30, 1971  E. W. KRAFT  3,623,373
BOURDON TUBE TYPE GAUGE
Filed Feb. 9, 1970  3 Sheets-Sheet 1
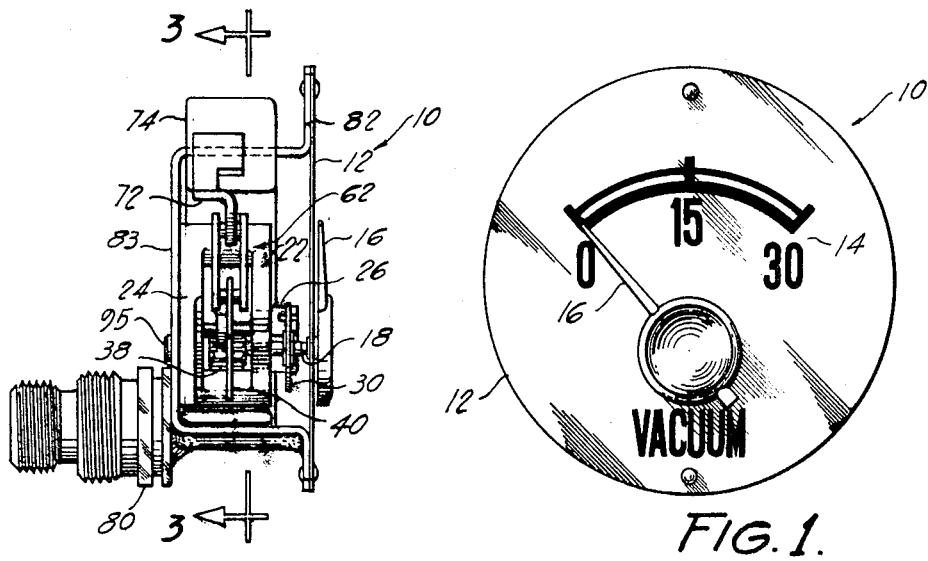
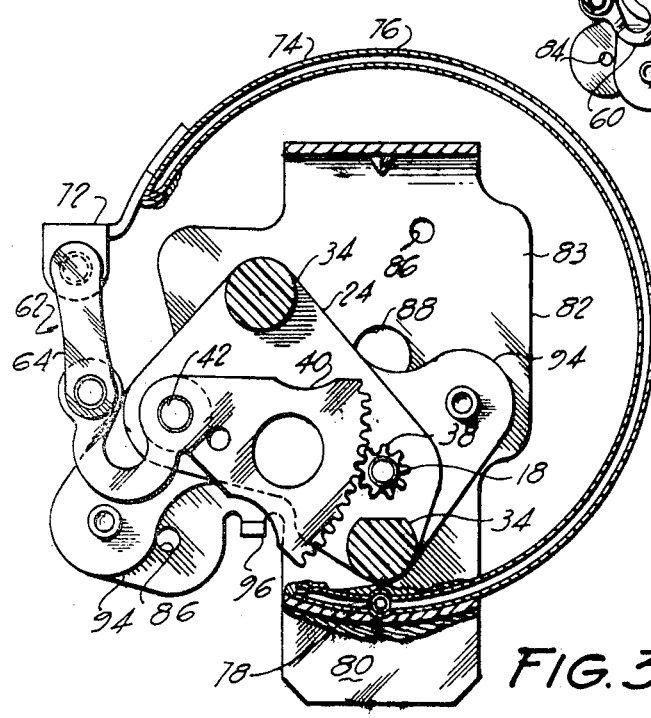
INVENTOR
EDMOND W. KRAFT
By Morton Lesser
ATTORNEY

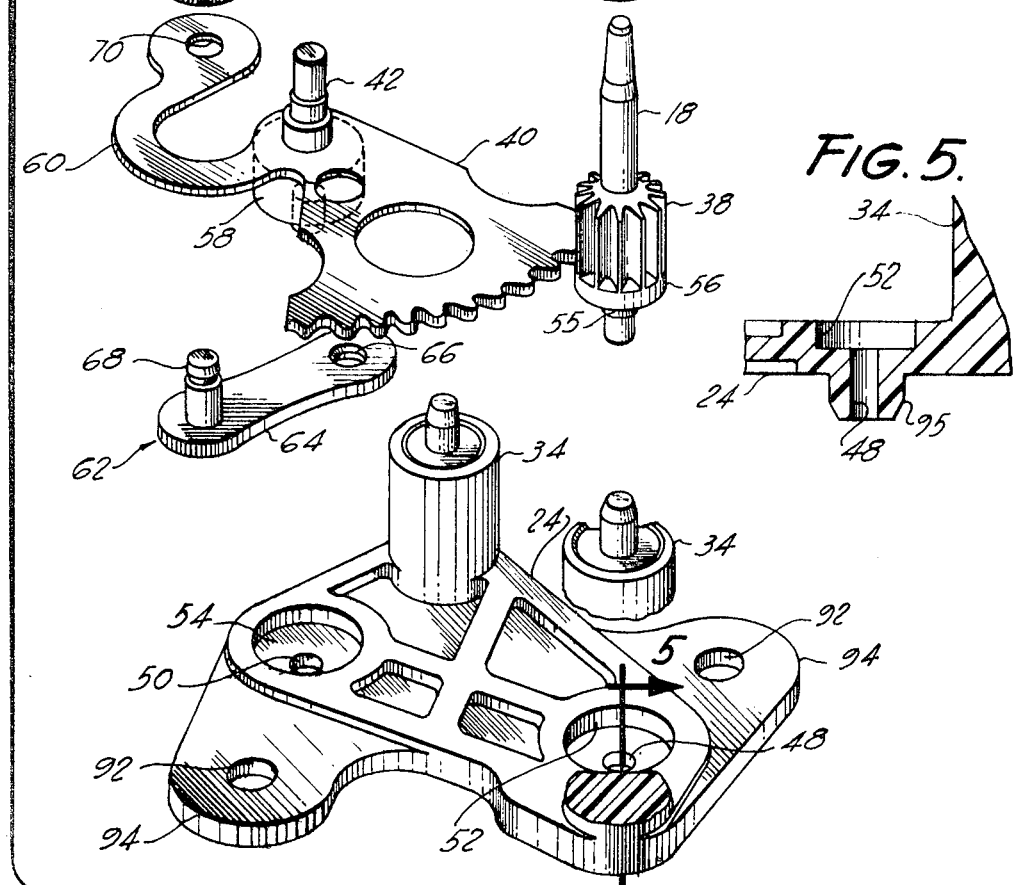

INVENTOR
EDMOND W. KRAFT

By Morton Lesser
ATTORNEY

United States Patent Office 3,623,373
Patented Nov. 30, 1971

3,623,373
BOURDON TUBE TYPE GAUGE
Edmond W. Kraft, Hoffman Estates, Ill., assignor to Stewart-Warner Corporation, Chicago, Ill.
Filed Feb. 9, 1970, Ser. No. 9,879
Int. Cl. G01l 7/04
U.S. Cl. 73—418     6 Claims

ABSTRACT OF THE DISCLOSURE

A pressure responsive gauge utilizing a plastic link for translating movement of a pressure responsive Bourdon tube to a dial pointer. If the gauge is used for sensing pressure over atmospheric, a headed snubbing device is used in the inlet to the Bourdon tube. A plastic frame pivotally supporting the pointer shaft and associated gears contains a silicone fluid. A mounting bracket having several sets of mounting holes carries the plastic frame to permit the gauge to be facilely assembled for several different types of movement.

BACKGROUND OF THE INVENTION

Field of the invention

This invention relates in general to pressure responsive gauges and more particularly to a facilely assembled and versatile pressure gauge of the Bourdon type having improved vibration and wear resistant character.

Description of the prior art

Bourdon type pressure gauges incorporate a Bourdon tube generally shaped in the form of a C with the pressure source connected adjacent a fixed end of the C for moving the free end of the C in response to a pressure change. A metal link adjacent the free end of the tube moves with the tube to pivot a sector gear for moving the pointer shaft. Vibrations created by pressure pulses and other variables result in accelerated wear at the pivot points and especially at the link with consequent instrument failure and in addition cause pointer fanning.

In addition, the basic pressure responsive mechanism must be capable of providing clockwise or counterclockwise indicator movement over selected or desired areas for either vacuum or greater than atmospheric pressure inputs.

SUMMARY OF THE INVENTION

The present invention utilizes several innovations to reduce the effect of vibrations. These innovations include the use of a two-part snap fit plastic link between the free end of the Bourdon tube and the sector gear driving the indicator. A plastic frame pivotally supports the pointer shaft and sector gear with a silicone fluid in the frame. By providing metal to plastic engagement between relatively movable surfaces, wear is reduced. A headed pin between the pressure source and the Bourdon tube also serves to reduce vibrations on the gauge. Several sets of mounting holes are provided in each of alternate brackets carrying the plastic frame and tube, with the different sets of holes permitting the location of the pointer shaft to be altered as required and the pointer shaft movement to be properly controlled.

Accordingly, among the objects of the present invention is the provision of a pressure responsive gauge having improved vibration and wear resistant qualities.

Another object of the present invention is the provision of a pressure gauge which can be facilely assembled for different types of movement.

Other objects and features of the present invention will become apparent on examination of the following specification, claims and drawings.

DESCRIPTION OF THE DRAWINGS

FIG. 1 is a front elevational view of a Bourdon tube type pressure gauge with the housing assembly omitted, capable of clockwise indicator movement in response to a vacuum input and counterclockwise indicator movement in response to over atmospheric pressure input.

FIG. 2 is a side elevational view of the Bourdon tube type gauge shown in FIG. 1;

FIG. 3 is a sectional view taken generally along the line 3—3 in FIG. 2;

FIG. 4 is an exploded isometric view of the plastic frame and movement assembly shown in the preceding figures;

FIG. 5 is a sectional view taken along the line 5—5 in FIG. 4;

FIG. 6 is a partial view illustrating the frame and movement assembly of FIGS. 1–5 arranged on the mounting bracket for large scale movement;

Figure 8:
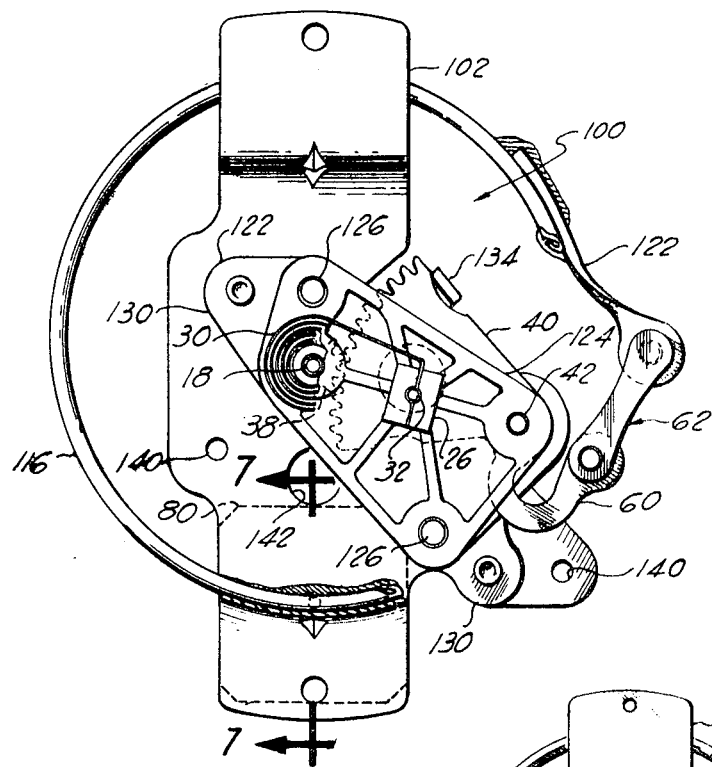
FIG. 8 is a front elevational view of a Bourdon tube type pressure gauge capable of clockwise movement in response to over atmospheric pressure input and counterclockwise movement in response to a vacuum input.

BRIEF DESCRIPTION OF PRESSURE GAUGE FOR EITHER CLOCKWISE MOVEMENT IN RESPONSE TO A VACUUM OR COUNTERCLOCKWISE MOVEMENT IN RESPONSE TO OVER ATMOSPHERIC PRESSURE

In FIG. 1 a pressure gauge assembly is indicated by the reference character 10. The pressure gauge 10 includes a dial plate 12 having indicia 14 marked thereon for indicating pressure usually in pounds per square inch in accordance with the position of a needle or indicator 16. The needle 16 is supported at one end of a pointer shaft 18 extending from a frame and movement assembly 20.

The pointer shaft 18 is journaled in spaced plastic frame plates 22 and 24 of the assembly 20. The plates 22 and 24 are formed of acetal commonly known as Delrin 500. Plate 22, as best seen in FIG. 4, has a forwardly projecting integrally formed block 26 in which an opening 28 is formed for receiving one end of a torsion spring 30 and a staking pin 32 to hold the one spring end. The other end of spring 30 is fixed to the pointer shaft 18 in a conventional manner for biasing the shaft towards a normal or home position.

Rear frame plate 24 has a plurality of spaced forwardly projecting integrally formed posts 34 thereon, which are probably best seen in FIG. 4. The post ends are reduced for fixed engagement in respective apertures 36 of the front plate 22 to hold the plates properly positioned. The post ends are either snap fit in openings 36 or sonic welded thereto. A plastic gear 38 of acetal is fixed on the metal pointer shaft 18 intermediate the two spaced plates 22 and 24 for engagement with teeth of a metal sector gear 40, which drives the gear 38, pointer shaft 18 and needle 16.

The sector gear 40 is supported between the two plates 22 and 24 by a metal pin 42 fixed to the gear intermediate the gear ends and pivotally carried by the plates 22 and 24. The shaft 18 and the pin 42 are pivotally received in respective openings 44 and 46 in plate 22 and in respective openings 48 and 50 in plate 24. The openings 48 and 50 communicate with respective recesses 52 and 54 in which a silicone fluid is deposited for damping ambient vibrations or pressure pulses to provide a more steady pointer movement. A boss or shoulder 55 on shaft 18 closes one end of the respective recess to fluid leakage and a similar boss on pin 42 closes one end of recess 54. The other end of recesses 52 and 54 are closed by respective shoulders 56 and 58 on shaft 18 and pin 42 respectively to prevent the leakage of fluid. An arcuately shaped arm 60 extends from the sector gear 40 in the same plane and is pivotally connected to a plastic link assembly 62.

The link assembly 62 comprises a pair of spaced plastic planar legs 64 of acetal each having an aperture 66 at one end aligned and snap fitted to one of the posts 68 at the other end of the opposite leg 64. The gear arm 60 has an aperture 70 for receiving the one post 68 so that the gear arm 60 is sandwiched between the legs 64 adjacent one end thereof and pivotally supported on the respective post 68.

Figure 7:
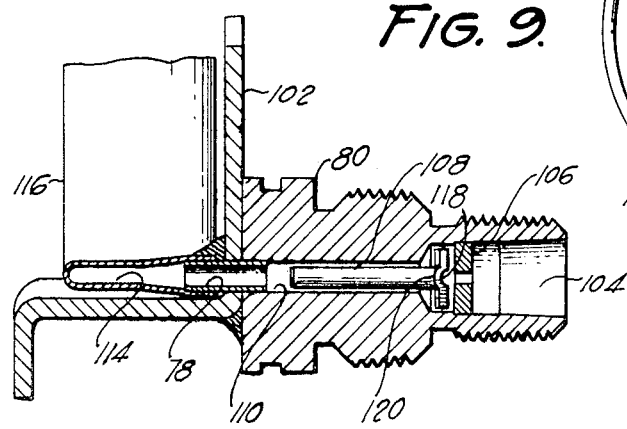
FIG. 7 is a sectional view taken generally along the line 7—7 in FIG. 8.

The other post 68 is pivotally received in an opening formed in a tab 72 sandwiched between the legs 64 and soldered on the closed free end of a generally C-shaped Bourdon tube 74. The Bourdon tube as seen in FIG. 3 defines a conventional C-shaped passageway or chamber 76, which communicates through a tube 78 and a passageway in boss 80 to a source of vacuum or pressure. The boss 80 and tube 78 are soldered to the adjacent end of tube 74 and secured to a mounting bracket 82. As seen in FIG. 3, the Bourdon tube extends in a counterclockwise arc from its fixed end adjacent bracket 82. The boss 80 is provided with suitable external threads to permit fastening to a housing wall and the connection of an inlet tube thereto for communicating changes in pressure to the gauge 10. The internal structure of the boss is seen in FIG. 7 and will be explained in more detail in connection with the pressure gauge arranged for clockwise movement in response to greater than atmospheric pressure.

The mounting bracket 82 is U-shaped having tabs at the leg ends for mounting the dial 12. The bracket 82 has a back or rear leg 83 provided with several pairs of openings 84 and 86 and a pair of openings 88 and 90 as may be best seen in FIGS. 3 and 6. Each pair of openings 84 and 86 registers with a single pair of openings 92 formed in ears 94 on the rear frame plate 24 for securing or riveting the plates 24 and 22 to the bracket 82. In addition, the bracket openings 88 and 90 register with a boss 95 integrally formed on the rear of plate 24 coaxial with opening 48 and pointer shaft 18, depending on which set of openings 84 or 86 are used.

As seen by comparing FIGS. 3 and 6, if the frame plate is riveted to openings 84 the pinion gear 38 engages the sector gear 40 intermediate the ends of the sector gear 40 and the pointer shaft 18 is located below the horizontal axis of the dial 12. This is done so that the dial and indicator as seen in FIG. 1 present an appearance similar to the type of gauge commonly known as a bi-torque gauge in the event the gauge 10 is to be used among a cluster of gauges having a bi-torque movement. The total swing or rotation of the pinion 38 and indicator 16 is therefore reduced to the length of sector gear that can be engaged with the pinion gear during the sector gear travel. An adjustable stop 96 bent, as desired, serves as a zero stop for gear 40, while the upper post 34 seen in FIG. 3 limits the travel of the sector gear in response to substantial over pressure or vacuum. The sector gear and post provide a rigid stop arrangement to prevent the tube from taking a set in the event of excess pressure. Limiting the indicator movement also averts the possibility of the indicator striking the gauge housing due to the off-center position or axis of shaft 18 relative the housing, which normally coaxially encircles the dial.

When a vacuum is applied to the Bourdon tube 74, the free end of the tube and tab 72 swing inwardly, thereby causing the link assembly 62 to push downwardly, as seen in FIG. 3, on arm 60 to pivot the sector gear 40 counterclockwise as seen in FIG. 3, about the axis of pin 42. This causes the gear 38, the pointer shaft 18 and indicator 16 to pivot clockwise, as seen in FIGS. 1 and 3 to swing the indicator to a position relative indicia 14 corresponding to the vacuum and thereby indicate the same with the travel of the indicator 16 limited to substantially 83 degrees. The plastic link assembly 62 facilitates absorption of vibrations to reduce wear and prolong the gauge life.

In the event the frame plate and movement assembly 20 is to provide 270 degrees of movement for the indicator 16, the plate 24 is secured at openings 86 of bracket 82 with the boss 94 located in opening 90 of bracket 82. The pointer shaft 18 is then located along the central axes of the dial 12 and the distance between the sector arm 40 and the free end of the Bourdon tube 74 is increased. A different length tab is therefore used in place of tab 72 to pivotally interconnect the Bourdon tube free end with link assembly 62, and a lighter gauge Bourdon tube is used to permit a greater degree of movement. Sector arm 60 is adjusted towards or away from pin 42 to compensate for tube variations. Since the sector gear 40, if arranged as indicated in FIG. 6, is engaged with pinion 38 near the end of the gear 40, the entire gear arc or length may be used to drive the indicator. The movement of indicator 16 may therefore range to 270 degrees. Stop 96 may be used for a zero stop by simply bending adjustment and the upper post 34 and gear 40 provide a rigid stop arrangement if excess over pressure is applied.

The gauge 10 is used also to indicate pressure or temperature. In these situations, pressure greater than atmospheric is usually applied to the Bourdon tube 74 and the tube expands outwardly of its fixed end. In addition, a damping assembly commonly called a snubber such as shown in FIG. 7, is used in this instance to reduce the effect of rapid pressure fluctuations. Since the tube 74 moves outwardly of its fixed end, the sector gear 40 moves clockwise as seen in FIG. 3, to move the pinion 38 and indicator 16 counterclockwise. The indicia on the dial plate 12 of course is altered accordingly and the stop 96 adjusted to permit the proper sector gear movement.

BRIEF DESCRIPTION OF PRESSURE GAUGE FOR EITHER CLOCKWISE MOVEMENT IN RESPONSE TO OVER ATMOSPHERIC PRESSURE OR COUNTERCLOCKWISE MOVEMENT IN RESPONSE TO A VACUUM

In FIG. 8 a frame and movement assembly for use in securing clockwise movement of an indicator in response to pressure changes greater than atmospheric such as created by oil or temperature, for example, is indicated by the reference character 100. Parts in assembly 100 similar to parts in assembly 20 are indicated by similar reference characters. The frame and movement assembly 100 is mounted on a U-shaped bracket 102 similar to bracket 82 but having differences which will be explained.

The bracket 102 has a boss 80 extending rearwardly from adjacent bottom portions of the rear leg of the bracket 102. The boss 80 is externally threaded to facilitate fastening to a case or housing and to a tube which transmits fluid pressure to a passageway 104. Although FIG. 7 is taken along the sectional line in FIG. 8, since the view is taken to illustrate a snubber most often used for damping pressure pulsations in a liquid such as oil with which the assembly 100 is usually used, the same structure with the snubbing arrangement omitted is used for vacuum gauges.

The passageway 104 has a washer 106 press fit therein and seated against a shoulder of the passageway 104. An opening in the washer communicates fluid from the passageway 104 past a headed pin 108, whose shank seats freely in a bore 110 of smaller diameter than passageway 104.

The bore 110 communicates fluid through a short tube 78 extending through bracket 102 to a passageway 114 in a C-shaped Bourdon tube 116. The tubes 78 and 116 together with the boss 80 are soldered to bracket 102 to prevent the leakage of fluid therefrom and secure the same to the bracket.

The headed pin 108 is provided with a groove 118 on the side of the head adjacent the washer 106, and a boss 120 is formed on the opposite side of the head to prevent the head from creating a sealing engagement with either washer 106 or bore 110, respectively. The pin 108 oscillates in response to pressure fluctuations and by its inertia and regulation of the passageway size serves to dampen rapid pressure pulsations.

The Bourdon tube 116 in this instance extends in a clockwise direction from the inlet tube 78 and is provided with a tab 122 at its free end of greater length than tab 72. A plastic link assembly 62 pivotally connects the tab 122 to the arm 60 of sector gear 40 which is supported on pin 42 pivotally carried between a plastic plate 22 and a plastic plate 124 as previously explained for plates 22 and 24. A pinion 38 and pointer shaft 18 are pivotally supported between the plates 22 and 124 as previously explained for plates 22 and 24. The plates are spaced and secured by posts 126 as before explained for posts 34. A boss such as 94 on the rear plate 124 seats in an opening 128 seen in FIG. 9, in the bracket 102, to locate the pointer shaft 18 at the central axes of the dial, when the ears 130 on plate 124 of frame assembly 100 are secured at openings 132 seen in FIG. 9. The frame assembly 100 is then in the position shown in FIG. 8.

In the position shown in FIG. 8, the sector gear 40 engages the pinion 38 near one end of the sector gear so that an extensive sector gear length is available to rotate the pointer shaft 18 and the indicator through an arc of 270 degrees. An adjustable zero stop 134 extends from bracket 102 to set the zero or normal position for the indicator.

In response to the application of oil pressure or vapor pressure in the case of temperature sensing, the free end of tube 116 moves outwardly of its fixed end in response to the application of greater than atmospheric pressure. The sector gear 40 therefore pivots counterclockwise about the axis of pin 42 to rotate the pinion 38 and associated indicator clockwise up to 270 degrees of indicator movement. The sector gear 40 engages lower post 126 to prevent excess travel in the event of over pressure.

Figure 9:
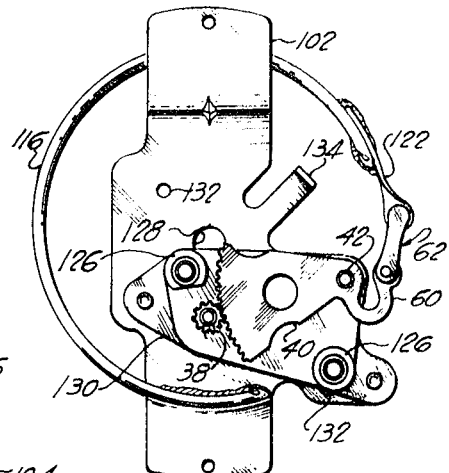
FIG. 9 is a partial view illustrating the frame and movement assembly of FIG. 8 arranged on the mounting bracket for small scale movement.

To position the pointer shaft off center in accordance with FIG. 1 to secure conformance with a cluster of bitorque gauges, the plate 124 is fastened at openings 140 of bracket 102 to locate the plate 124 and sector gear as shown in FIG. 9 with the boss on plate 124 corresponding to 95 located in opening 142 of the bracket 102. A different tab such as 72 and a thicker Bourdon tube are used since the distance between the free end and link assembly 62 is shortened as a result of the location change and the movement is reduced. The pinion 38 then engages the gear 40 intermediate the gear ends so that the travel is limited to the distance between the point of engagement and the position where the sector gear 40 engages lower post 126 seen in FIG. 9. The zero stop is set to hold the indicator clockwise travel to 83 degrees.

The movement 100 may also be used for a vacuum gauge having counterclockwise indicator movement. In this event the headed pin 108 in boss 80 is omitted and the washer 108 alone serves to dampen pulsations. The stops, such as 134, are appropriately adjusted and positioned. The Bourdon tube 116, in the event a vacuum is applied thereto, moves inwardly towards its fixed end thereby rotating the sector gear 40 clockwise about the axis of pin 42. Pinion 38 is therefore rotated counterclockwise to rotate the indicator accordingly.

The foregoing describes a durable and versatile pressure gauge assembly whose inventive concepts are believed set forth in the accompanying claims.

What is claimed is:

1. A pressure gauge of the type including a Bourdon tube having a fixed end to which an inlet passageway is connected for introducing a fluid subject to variations in pressure into said tube for moving the opposite end of said tube either towards or from said fixed end in correspondence with the pressure of said fluid, the improvement comprising a pinion, a sector gear, a pair of spaced plastic frame plates, means including said plates for pivotally supporting said sector gear and pinion between said plates with said sector gear engaging said pinion, an indicator moved by said pinion in response to movement of said pinion by said gear to indicate the pressure of said fluid, means for biasing said indicator, pinion and sector gear towards one position, a link pivotally connected to said Bourdon tube opposite end and pivotally connected to said sector gear for moving said sector gear, pinion and indicator in correspondence with the movement of said Bourdon tube opposite end, a mounting bracket secured to said Bourdon tube fixed end and having one plurality of openings spaced a predetermined distance apart and a second plurality of openings spaced said predetermined distance apart, and means spaced said predetermined distance apart on one of said plates for registering said plates alternatively with either said one or second plurality of openings whereby said plates are mounted on said bracket in a respective position for selecting the normal circumferential position in which said sector gear is engaged by said pinion to control the movement range of said indicator.

2. The pressure gauge claimed in claim 1 in which said link comprises a pair of planar plastic walls each having a post integrally formed thereon in snap fitted engagement with the respective other plastic wall and with one of said posts pivotally engaged with said sector gear and the other post pivotally engaged with said opposite tube end.

3. The pressure gauge claimed in claim 1 in which said one plurality of openings is located in said bracket for selecting said circumferential position intermediate the ends of said sector gear to limit the movement of said indicator to an arc of less than 90 degrees and the other plurality of openings is located in said bracket for selecting said circumferential position adjacent one end of said sector gear for enabling said indicator to move through an arc of substantially 270 degrees.

4. The pressure gauge claimed in claim 3 in which said Bourdon tube opposite end moves in one direction relative said fixed end in response to the application of a vacuum to said tube for moving said indicator in a corresponding direction and said Bourdon tube opposite end moves in a direction opposite said one direction in response to the application of over atmospheric pressure to said tube for moving said indicator in a direction opposite said corresponding direction.

5. A pressure gauge of the type including a Bourdon tube having a fixed end to which an inlet passageway is connected for introducing a fluid subject to variations in pressure into said tube for moving the opposite end of said tube either towards or from said fixed end in correspondence with the pressure of said fluid, the improvement comprising a pinion, a sector gear, a pair of spaced frame plates, means including said plates for pivotally supporting said sector gear and pinion between said plates with said sector gear engaging said pinion, an indicator moved by said pinion in response to movement of said pinion by said gear to indicate the pressure of said fluid, means for biasing said indicator, pinion and sector gear towards one position, and a pair of spaced planar plastic legs each having a post at a respective end and an opening at the respective other end for snap fit engagement with the post on the other leg and said sector gear pivotally engaged with one of said posts intermediate said legs and the free opposite end of said Bourdon tube pivotally engaged with the other one of said posts intermediate said legs for moving said sector gear, pinion and indicator in correspondence with the movement of said Bourdon tube free opposite end.

6. The pressure gauge claimed in claim 5 in which said inlet passageway has an enlarged portion, a washer seated intermediate the ends of said enlarged portion and having an opening therein, a pin having a head thereon with said head seated in said enlarged portion between said washer and said tube for regulating the passage of fluid through said washer opening, and means on said pin for preventing said head from sealing either said washer opening or the adjacent end of said enlarged passageway.

References Cited

UNITED STATES PATENTS

| | | | |
|---|---|---|---|
| 3,530,720 | 9/1970 | Harland et al. | 73—415 |
| 3,504,548 | 4/1970 | Granel | 73—397 |
| 1,909,857 | 5/1933 | Eshbaugh | 73—411 |
| 3,367,187 | 2/1968 | Smith et al. | 73—418 |
| 2,478,022 | 8/1949 | Sugden | 73—418 X |
| 1,898,257 | 2/1933 | Nelson | 73—411 X |

FOREIGN PATENTS

| | | | |
|---|---|---|---|
| 2,742 | 8/1875 | Great Britain | 73—414 |

LOUIS R. PRINCE, Primary Examiner

D. M. YASICH, Assistant Examiner

U.S. Cl. X.R.

73—414